Figure 1:
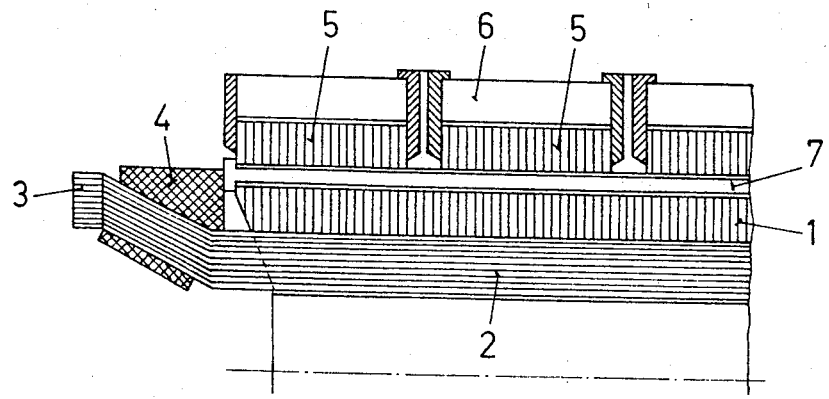

United States Patent
Abegg

[11] 3,789,252
[45] Jan. 29, 1974

[54] TWO-PART STATOR FOR LARGE ROTATING ELECTRICAL MACHINES

[75] Inventor: Karl Abegg, Oberrieden, Switzerland

[73] Assignee: Aktiengesellschaft Brown, Boveri & Cie, Baden, Switzerland

[22] Filed: Feb. 14, 1972

[21] Appl. No.: 225,991

[30] Foreign Application Priority Data
Feb. 24, 1971  Switzerland.......................... 2639/71

[52] U.S. Cl................................. 310/259, 310/112
[51] Int. Cl. ............................................... H02k 1/12
[58] Field of Search....... 310/52, 54, 58, 59, 51, 65, 310/112, 217, 218, 254, 258, 259, 42

[56] References Cited
UNITED STATES PATENTS

| | | | |
|---|---|---|---|
| 3,221,195 | 11/1965 | Hoffmann | 310/259 |
| 3,445,702 | 5/1969 | Silva | 310/218 |
| 3,508,093 | 4/1970 | Obukhov | 310/65 |
| 3,652,889 | 3/1972 | Reece | 310/218 |
| 3,146,605 | 9/1964 | Rachfal | 310/54 |
| 3,531,667 | 9/1970 | Barton | 310/258 |
| 2,618,756 | 11/1952 | Fechheimer | 310/54 |
| 1,196,345 | 8/1916 | Field | 310/65 |

*Primary Examiner*—R. Skudy
*Attorney, Agent, or Firm*—Pierce, Scheffler & Parker

[57] ABSTRACT

A two-part stator for large rotating electrical machines which consists of an outer non-wound stator part subdivided in the axial direction into annular laminated sections and a unitary inner laminated part to which the winding is applied.

6 Claims, 5 Drawing Figures

3,789,252

TWO-PART STATOR FOR LARGE ROTATING ELECTRICAL MACHINES

The invention concerns the construction of a two-part stator for large rotating electrical machines.

The exponentially increasing power demand necessitates the provision of 2 and 4 pole generators, the output of which is increased by a better utilisation of the material and more efficient cooling systems. This is accompanied by a constant increase in the dimensions of the machines and their transportation weight.

Although large power stations are generally located at the coast or near navigable rivers, weight restrictions frequently cause difficulties in connection with the transportation of the heavy machine parts, particularly the generator stators. In such cases it is possible to assemble the stator in the power station, this being the usual procedure with large hydraulic power stations. Such a solution, however, prevents the manufacturer from undertaking any acceptance tests in the factory, unless additional risks due to intermediate erections are taken into account, whilst in the case of large thermo-nuclear power stations where the erection programmes are already very complicated additional difficulties are encountered.

In connection with smaller electrical machines, it is known to manufacture the stator core in the form of two cylindrical laminated bodies of which one can be inserted into the other, whereby one body carries the stator winding and both bodies are joined together by means of a metallic adhesive material.

This kind of stator construction is, however, not suitable for high power generators with a small number of poles, a stator length of about 10 metres and a stator diameter exceeding 2 metres, because the outer stator body then becomes so large that it cannot be transported.

The object of the invention is to provide a two-part stator for large rotating electrical machines which consists of an outer laminated body (outer stator) and an inner laminated body (inner stator) which carries the winding, whereby the transportation weights are kept within admissible limits and at the same time it is possible to perform acceptance tests in the manufacturer's workshops without taking any risks or causing additional costs in the power station. In accordance with the invention this is achieved in that the outer stator is subdivided in the axial direction into several annular laminated parts and the inner stator is in one piece.

A further advantage in connection with the construction according to the invention is that the lifting capacity of the cranes in the power station can be chosen for the usual transportation weights and do not have to take into account the maximum weight of the generator stator. Also complicated and expensive hoisting equipment such as is required for the stator erection in power stations having a limited crane capacity can be avoided.

Figure 2:
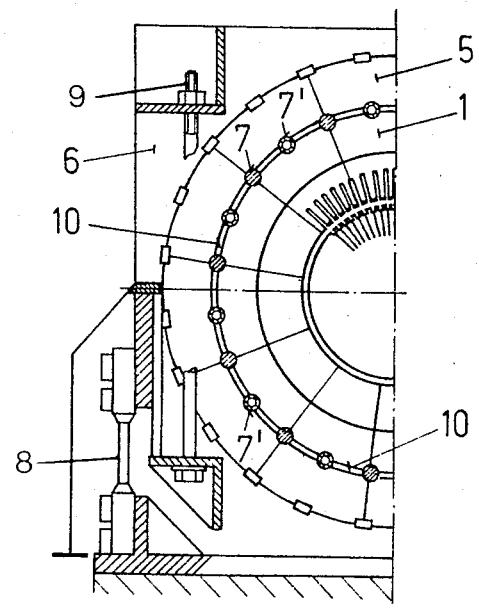
Figure 3:
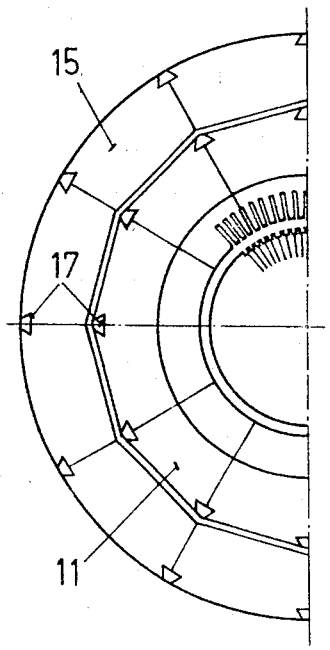
Figure 5:
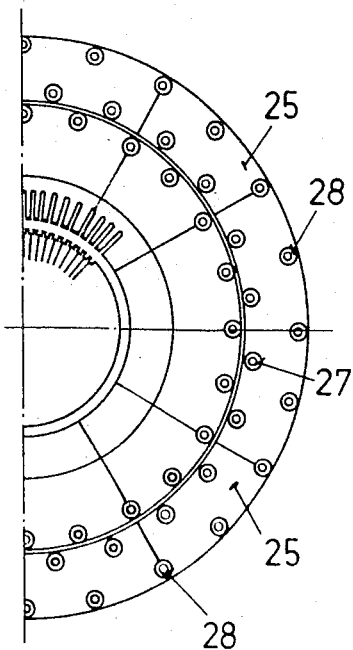
Figure 4:
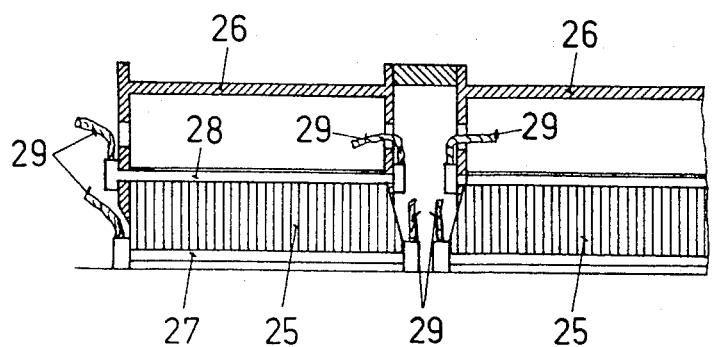

Several constructional forms of the invention are now explained by means of the accompanying drawings where FIG. 1 shows part of a stator in longitudinal section, FIG. 2 a cross-sectional view of the stator according to FIG. 1, FIG. 3 a cross-sectional view of a stator in accordance with another embodiment of the invention, FIG. 4 a longitudinal sectional view of part of a stator in accordance with a further embodiment of the invention, FIG. 5 a cross-sectional view of the stator according to FIG. 4.

In the embodiment of the invention shown in FIGS. 1 and 2, the inner stator consists of a single laminated unitary body 1 provided with teeth for carrying 3 of which are held by supports 4. The outer stator which surrounds the inner stator and is spaced therefrom is divided in the axial direction into a number of annular laminated parts 5 which are arranged in a correspondingly subdivided stator casing 6. These annular parts 5 can furthermore be divided in the circumferential direction into segments. The laminated parts 5 of the outer stator and the laminated body 1 of the inner stator are held together by means of press bolts 7 which are so arranged that they are in engagement with the laminated elements of both stator parts and thus also prevent a relative rotation between the inner and outer stator. Forces acting on the inner stator can be transmitted to the foundation either directly or by way of spring elements 8 located on the casing 6 of the outer stator. The upper part of the stator casing 6 is connected to the lower part of the casing by means of tension bolts 9. The intermediate space between the inner and outer stator can be filled at least partly with insulating material.

A cooling medium can also flow through the intermediate space between the inner and outer stator whereby an improved cooling of the stator laminations is achieved. It is also possible to construct at least some of the press bolts 7 in the form of cooling tubes which are made of non-magnetic material and through which a liquid coolant, for instance water, flows. These cooling tubes, indicated in FIG. 2 by 7', are insulated from the inner and outer stator.

FIG. 3 shows a cross-sectional view of a stator where the inner periphery of the outer stator 15 and the outer periphery of inner stator 11 have polygonal contours. In this way it is possible to obtain a very simple connection between the two stator parts 15 and 11 where a relative rotation of these parts is impossible. The press bolts for the stator laminations are indicated in the FIG. by numeral 17.

A further embodiment of the two-part stator according to the invention is shown in longitudinal and cross-section in FIGS. 4 and 5 respectively. The outer stator 25 is again subdivided in the axial direction into several laminated parts 25 which are provided with hollow axial press bolts 27, 28 having any desirable contour. These press bolts are connected by means of supply and discharge pipes 29 to a liquid cooling system and the cooling liquid flows through the stator casing 26. The ends of adjacent laminated parts 25 are provided with press plates which consist of magnetic laminations which are glued together and bevelled in such a manner that the width of the press plates decreases from the inside to the outside of the outer stator 25. In this way it is possible to obtain a good magnetic coupling between the inner and outer stator and the pipes for the cooling liquid can be located between the laminated parts, so that there is only a minimum reduction in the width of the iron. The necessary connection between the outer and inner stator which must not allow any relative rotation between these parts, can for example be achieved by gluing the parts together by means of a thin layer of insulation combined with a synthetic resin, or by means of an arrangement analogous to that illustrated in FIG. 3.

The two-part stator construction according to the invention has a number of important advantages. Both stator parts are so firmly connected together that vibrations of the laminations during normal operation cannot attain dangerous amplitudes and the torque which occurs during normal operation or the case of a short-circuit can be absorbed. By means of the use of grain-oriented laminations in the inner and outer stator, it is possible to obtain optimal results as regards the size and weight of the stator, so that the inner part of the stator together with its winding can be tested, transported, and installed as a single unit. After the inner stator has been tested in the manufacturer's factory, it can be transported without any difficulty, just like the rotor of machine, by means of the usual available transport equipment. Furthermore it is possible to cool the stator in a very efficient manner.

I claim:

1. A two-part stator for large diameter rotating electrical machines consisting of an outer laminated non-toothed stator member, an inner laminated stator member spaced from said outer stator member and provided with teeth for carrying a stator winding, said outer stator member being subdivided in the axial direction into annular laminated parts and the inner stator member being undivided in the axial direction, and bolt means for connecting together the inner and outer stators in spaced relation and to compress the laminated body of the inner stator, thereby enabling the outer stator to be assembled on the inner stator at the installation site.

2. A two-part stator as claimed in claim 1 wherein said bolt means comprise press bolts.

3. Two-part stator as in claim 2, characterised in that the press bolts consist of tubes through which a cooling medium is caused to flow.

4. Two-part stator as in claim 1, characterised that a cooling medium flows through the axial intermediate space between the inner and outer stator.

5. Two-part stator as in claim 1, characterised in that the axial intermediate space between the inner and outer stator is at least partly filled with an insulating material.

6. Two-part stator as in claim 5, characterised in that the inner stator is joined to the outer stator by means of a synthetic resin.

* * * * *